(12) United States Patent
Oyobe et al.

(10) Patent No.: US 8,143,861 B2
(45) Date of Patent: Mar. 27, 2012

(54) CHARGE CONTROL DEVICE AND VEHICLE USING THE SAME

(75) Inventors: Hichirosai Oyobe, Toyota (JP); Tetsuhiro Ishikawa, Toyota (JP); Makoto Nakamura, Okazaki (JP); Yukihiro Minezawa, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 524 days.

(21) Appl. No.: 12/227,590

(22) PCT Filed: Jun. 12, 2007

(86) PCT No.: PCT/JP2007/062196
§ 371 (c)(1),
(2), (4) Date: Nov. 21, 2008

(87) PCT Pub. No.: WO2007/145351
PCT Pub. Date: Dec. 21, 2007

(65) Prior Publication Data
US 2009/0146612 A1    Jun. 11, 2009

(30) Foreign Application Priority Data
Jun. 16, 2006    (JP) .................................. 2006-167387

(51) Int. Cl.
*H02J 7/00*    (2006.01)
*B60W 20/00*    (2006.01)
*F01L 1/12*    (2006.01)

(52) U.S. Cl. ........ 320/138; 320/104; 307/10.1; 323/205; 323/251; 123/82; 123/83; 123/247; 123/507; 903/906; 180/65.29

(58) Field of Classification Search .................. 320/104, 320/116, 138; 307/10.1; 323/205, 251; 123/82, 123/83, 247, 507
See application file for complete search history.

(56) References Cited

U.S. PATENT DOCUMENTS

| 4,549,121 A * | 10/1985 | Gale ............................. 318/271 |
| 5,099,186 A * | 3/1992 | Rippel et al. .................. 318/803 |
| 6,054,818 A * | 4/2000 | Tabata et al. .................. 318/139 |
| 6,091,216 A * | 7/2000 | Takahashi et al. ........ 318/400.09 |
| 6,555,993 B2 * | 4/2003 | Taniguchi et al. .............. 322/28 |
| 6,807,476 B2 * | 10/2004 | Ando et al. ................... 701/110 |
| 2003/0163244 A1 * | 8/2003 | Ando et al. ................... 701/112 |
| 2009/0277704 A1 * | 11/2009 | Yamaguchi ................ 180/65.31 |

FOREIGN PATENT DOCUMENTS

| JP | A-4-295202 | 10/1992 |
| JP | A-8-126121 | 5/1996 |
| JP | A-8-228443 | 9/1996 |
| JP | A-11-341897 | 12/1999 |
| JP | A-2006-158121 | 6/2006 |
| JP | A-2006-158124 | 6/2006 |
| WO | WO 2006/059748 A2 | 6/2006 |

* cited by examiner

*Primary Examiner* — Patrick Assouad
*Assistant Examiner* — Steve T Chung
(74) *Attorney, Agent, or Firm* — Oliff & Berridge, PLC

(57) ABSTRACT

At the time of charging a power storage device from a commercial power supply, electric power from the commercial power supply is applied to a neutral point of each of first and second motor generators. A rotation preventing control unit (222) determines one phase to be subjected to switching control in the first inverter, based on a rotation angle ($\theta 1$) of the first motor generator. Further, rotation preventing control unit (222) calculates torque generated in the first motor generator, generates a torque control value for canceling out the torque, and outputs the value to a phase voltage operating unit (214) for motor control.

10 Claims, 10 Drawing Sheets

|  | Tu | Tv | Tw |
|---|---|---|---|
| U-PHASE ARM | ON/OFF | SDOWN | SDOWN |
| V-PHASE ARM | SDOWN | ON/OFF | SDOWN |
| W-PHASE ARM | SDOWN | SDOWN | ON/OFF |

CHARGE CONTROL DEVICE AND VEHICLE USING THE SAME

TECHNICAL FIELD

The present invention relates to a charge control device and a vehicle provided with the charge control device and, more specifically, to a charge control device for charging a power storage device mounted on a vehicle from a commercial power supply and to a vehicle provided with the charge control device.

BACKGROUND ART

Japanese Patent Laying-Open No. 8-126121 discloses a charging apparatus mounted on an electric vehicle. The charging apparatus mounted on a vehicle includes two permanent magnet motors, two inverters provided corresponding to respective motors, a battery, a connecting circuit connecting a commercial power supply to a neutral point of each motor, and a control circuit charging the battery from the commercial power supply by causing equal currents to three-phase coils of the motors.

In the charging apparatus mounted on a vehicle, equal currents are caused to flow through three-phase coils of the motors and, therefore, generated magnetic fields are cancelled out by each other to be zero. Therefore, by the charging apparatus mounted on a vehicle, it is possible to charge the battery from a commercial power supply while preventing rotor rotation.

The afore-mentioned laid-open application further discloses a charging apparatus mounted on a vehicle including a sensor detecting a position of a magnetic pole of a rotor in the permanent magnet motor, means for selecting one-phase or two-phase coils that attain minimum torque for rotating the rotor based on the detected magnetic pole position of the rotor, and a control circuit charging the battery from a commercial power supply by causing a current to flow through the selected coil.

In the charging apparatus mounted on a vehicle, only a small torque is generated and, because of friction resistance of the vehicle and the like, rotor rotation is prevented. Therefore, by the charging apparatus mounted on a vehicle, movement of the vehicle during charging can be prevented.

When equal currents are caused to flow through three-phase coils of the motor, however, what can be utilized is only the leakage inductance of the coil. Therefore, there may be problems that the commercial power supply cannot sufficiently be boosted to the battery voltage, or influence of ripple to the input side increases.

Further, when the one-phase coil or two-phase coils are selected and a current is caused to flow therein, the motor generates torque and, possibility of the vehicle moving during charging cannot perfectly be eliminated.

DISCLOSURE OF THE INVENTION

The present invention was made to solve such problems, and its object is to provide a charge control device capable of attaining sufficient inductance and reliably preventing movement of the vehicle, when a power storage device is charged from a power supply outside the vehicle.

Another object of the present invention is to provide a vehicle provided with a charge control device capable of attaining sufficient inductance and reliably preventing movement of the vehicle, when a power storage device is charged from a power supply outside the vehicle.

The present invention provides a charge control device for charging a power storage device mounted on a vehicle from a power supply outside the vehicle, including an AC rotating electric machine, an inverter, a connecting device, an inverter control unit, and a rotation preventing unit. The AC rotating electric machine includes a star-connected first poly-phase winding as a stator winding. The inverter is connected to the poly-phase winding and performs power conversion between the AC rotating electric machine and the power storage device. The connecting device is configured to allow connection of the power supply outside the vehicle to a neutral point of the poly-phase winding. The inverter control unit controls any one phase of the inverter such that electric power from the power supply outside the vehicle applied to the neutral point by the connecting device is converted to charge the power storage device. The rotation preventing unit is configured to prevent rotation of the AC rotating electric machine at the time of charging the power storage device from the power supply.

Preferably, the rotation preventing unit includes a braking device fixing a rotor of the AC rotating electric machine to be in a non-rotating state.

Further, the present invention provides a charge control device for charging a power storage device mounted on a vehicle from a power supply outside the vehicle, including a first AC rotating electric machine, a first inverter, a connecting device, an inverter control unit, an internal combustion engine, a gear mechanism, and a rotation preventing unit. The first AC rotating electric machine includes a star-connected first poly-phase winding as a stator winding. The first inverter is connected to the first poly-phase winding and performs power conversion between the first AC rotating electric machine and the power storage device. The connecting device is configured to allow connection of the power supply outside the vehicle to a first neutral point of the first poly-phase winding. The inverter control unit controls any one phase of the first inverter such that electric power from the power supply outside the vehicle applied to the first neutral point by the connecting device is converted to charge the power storage device. The gear mechanism is connected to an output shaft of the internal combustion engine, a rotation shaft of the first AC rotating electric machine and a driving shaft of the vehicle, and transmits power among the output shaft, the rotation shaft and the driving shaft. The rotation preventing unit is configured to prevent rotation of the driving shaft by torque generated by the first AC rotating electric machine, when the power storage device is charged from the power supply outside the vehicle.

Preferably, the charge control device further includes a second AC rotating electric machine, a second inverter, a rotation angle detecting device, and a current detecting device. The second AC rotating electric machine has a rotation shaft mechanically coupled to the driving shaft of the vehicle. The second inverter drives the second AC rotating electric machine. The rotation angle detecting device detects a rotation angle of the first AC rotating electric machine. The current detecting device detects a current flowing through the first AC rotating electric machine. The rotation preventing unit calculates an output torque of the first AC rotating electric machine based on values detected by each of the rotation angle detecting device and the current detecting device and controls the second inverter such that the second AC rotating electric machine outputs a torque canceling out the calculated output torque.

More preferably, the second AC rotating electric machine includes a star-connected second poly-phase winding as a stator winding. The connecting device is configured to allow connection of the power supply outside the vehicle to the first neutral point and to a second neutral point of the second poly-phase winding. The inverter control unit further controls zero-phase voltage of the second inverter such that electric power from the power supply outside the vehicle applied to the first and second neutral points by the connecting device is converted to charge the power storage device.

Preferably, the rotation preventing unit reduces rotation resistance of the output shaft of the internal combustion engine.

More preferably, the rotation preventing unit sets at least one of an intake valve and an exhaust valve of the internal combustion engine to an open state.

Further preferably, the charge control device further includes an engaging element. The engaging element is provided between the output shaft of the internal combustion engine and the gear mechanism. The rotation preventing unit sets the engaging element to a disengaged state.

Further, the present invention provides a charge control device for charging a power storage device mounted on a vehicle from a power supply outside the vehicle, including a first AC rotating electric machine, a first inverter, a connecting device, a rotation angle detecting device, and an inverter control unit. The first AC rotating electric machine includes a star-connected first poly-phase winding as a stator winding. The first inverter is connected to the first poly-phase winding and performs power conversion between the first AC rotating electric machine and the power storage device. The connecting device is configured to allow connection of the power supply outside the vehicle to a first neutral point of the first poly-phase winding. The rotation angle detecting device detects a rotation angle of the first AC rotating electric machine. The inverter control unit controls the first inverter such that electric power from the power supply outside the vehicle applied to the first neutral point by the connecting device is converted to charge the power storage device while current component in q-axis direction of the first AC rotating electric machine is suppressed.

Preferably, the charge control device further includes a second AC rotating electric machine and a second inverter. The second AC rotating electric machine includes a star-connected second poly-phase winding as a stator winding. The second inverter is connected to the second poly-phase winding and performs power conversion between the second AC rotating electric machine and the power storage device. The connecting device is configured to allow connection of the power supply outside the vehicle to the first neutral point and to a second neutral point of the second poly-phase winding. The inverter control unit further controls zero-phase voltage of the second inverter such that electric power from the power supply outside the vehicle applied to the first and second neutral points by the connecting device is converted to charge the power storage device.

Further, the present invention provides a vehicle provided with any of the above-described charge control devices.

In the present invention, electric power from the power supply outside the vehicle is applied to a neutral point of the first AC rotating electric machine by the connecting device. The first inverter control unit controls any one phase of the first inverter such that the electric power from the power supply outside the vehicle applied to the neutral point is converted to charge the power storage device. Therefore, inductance of the winding corresponding to the controlled phase can be made use of Here, when any one phase of the first inverter is regulated, the first AC rotating electric machine generates torque, while in the present invention, the rotation preventing unit prevents rotation of the first AC rotating electric machine, when the power storage device is charged from a power supply outside the vehicle.

Therefore, according to the present invention, sufficient inductance can be attained, and rotation of the first AC rotating electric machine can reliably be prevented, when the power storage device is charged from a power supply outside the vehicle.

Further, in the present invention, when any one phase of the first inverter is regulated, torque is transmitted to the driving shaft through the gear mechanism, while the rotation preventing unit prevents rotation of the driving shaft by the torque generated by the first AC rotating electric machine when the power storage device is charged from a power supply outside the vehicle.

Therefore, according to the present invention, sufficient inductance can be attained and movement of the vehicle can reliably be prevented, when the power storage device is charged from a power supply outside the vehicle.

Further, in the present invention, the inverter control unit controls the first inverter such that current component in the q-axis direction in the first AC rotating electric machine is prevented and the electric power from the power supply outside the vehicle applied to the first neutral point by the connecting device is converted to charge the power storage device. Therefore, larger inductance can be attained than when equal currents are caused to flow to the three-phase coils, and the torque generated by the first AC rotating electric machine is suppressed.

Therefore, according to the present invention, sufficient inductance can be attained, and rotation of the first AC rotating electric machine can reliably be prevented, when the power storage device is charged from a power supply outside the vehicle.

BEST MODES FOR CARRYING OUT THE INVENTION

Figure 1:
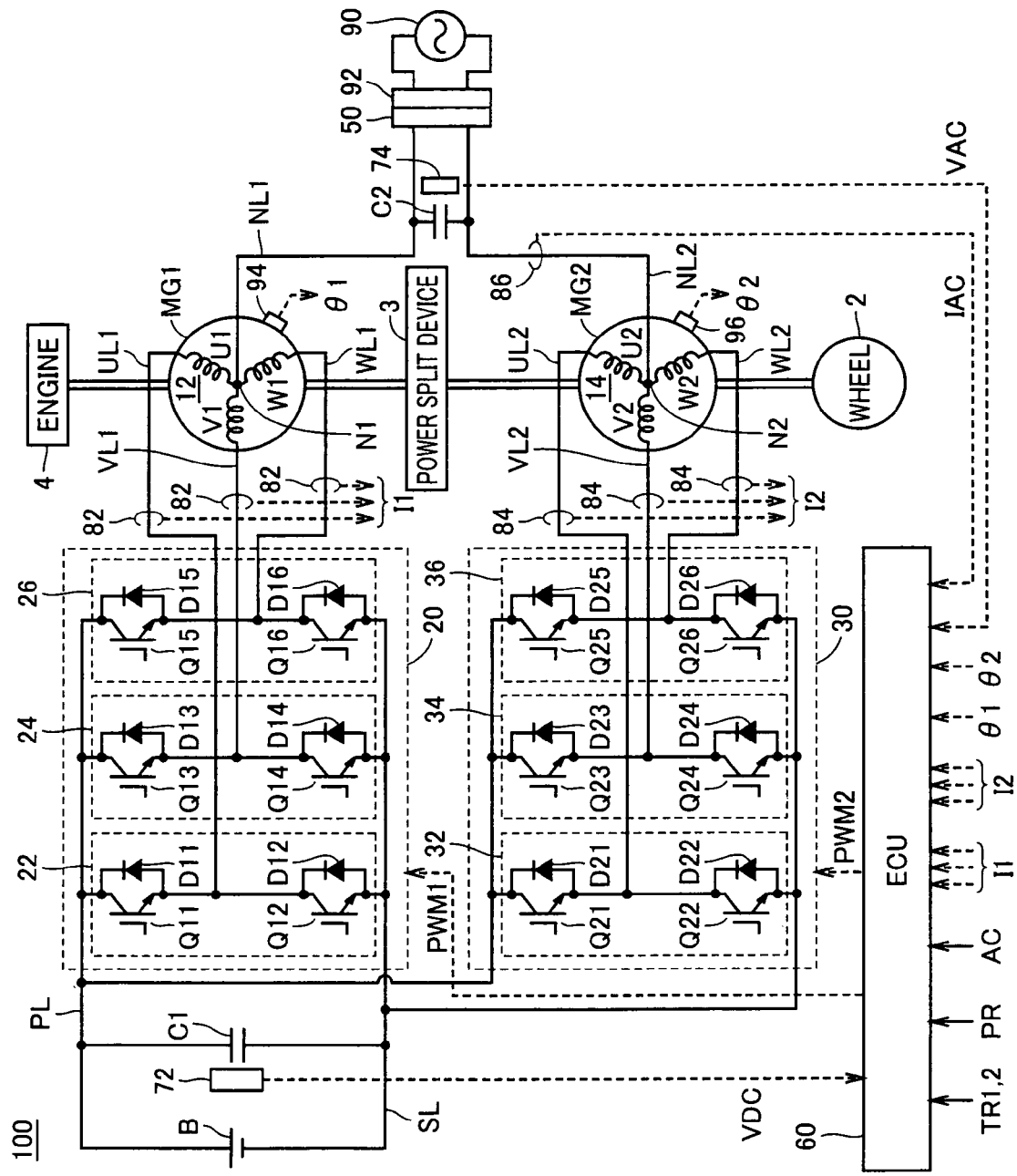
FIG. 1 is an overall block diagram of a hybrid vehicle shown as an example of the vehicle in accordance with Embodiment 1 of the present invention.

In the following, embodiments of the present invention will be described in detail with reference to the figures. Throughout the figures, the same or corresponding portions are denoted by the same reference characters and description thereof will not be repeated.

Embodiment 1

FIG. 1 is an overall block diagram of the hybrid vehicle shown as an example of the vehicle in accordance with Embodiment 1 of the present invention. Referring to FIG. 1, a hybrid vehicle 100 includes an engine 4, motor generators MG1 and MG2, a power split device 3, and wheels 2. Hybrid vehicle 100 further includes a power storage device B, inverters 20 and 30, and an ECU (Electronic Control Unit) 60.

Hybrid vehicle 100 further includes a capacitor C1, a power line PL, a ground line SL, U-phase lines UL1 and UL2, V-phase lines VL1 and VL2, W-phase lines WL1 and WL2, a voltage sensor 72, current sensors 82 and 84 and resolvers 94 and 96. Hybrid vehicle 100 further includes power lines NL1 and NL2, a connector 50, a capacitor C2, a voltage sensor 74, and a current sensor 86.

Hybrid vehicle 100 runs using engine 4 and motor generator MG2 as power sources. Power split device 3 is coupled to engine 4 and to motor generators MG1 and MG2, and distributes power among these. Motor generator MG1 is incorporated in the hybrid vehicle 100, operating as a generator driven by the engine 4 and as a motor that can start the operation of engine 4. Motor generator MG2 is incorporated in the hybrid vehicle 100 as a motor driving wheel 2.

Positive electrode and negative electrode of power storage device B are connected to power line PL and ground line SL, respectively. Capacitor C1 is connected between power line PL and ground line SL. Inverter 20 includes a U-phase arm 22, a V-phase arm 24 and a W-phase arm 26. U-phase arm 22, V-phase arm 24 and W-phase arm 26 are connected in parallel between power line PL and ground line SL. U-phase arm 22 includes series-connected npn transistors Q11 and Q12, V-phase arm 24 includes series-connected npn transistors Q13 and Q14, and W-phase arm 26 includes series-connected npn transistors Q15 and Q16. Between the collector and emitter of npn transistors Q11 to Q16, diodes D11 to D16 are connected, respectively, to cause current flow from the emitter side to the collector side.

As the above-described npn transistors and other npn transistors that will be described later in the specification, an IGBT (Insulated Gate Bipolar Transistor) may be used. Further, in place of the npn transistor, a power switching element such as a power MOSFET (Metal Oxide Semiconductor Field-Effect Transistor) may be used.

Motor generator MG1 includes a three-phase coil 12 as a stator coil. U-phase coil U1, V-phase coil V1 and W-phase coil W1 forming the three-phase coil have one end connected together to form a neutral point N1, and U-phase coil U1, V-phase coil V1 and W-phase coil W1 have the other end connected to nodes between upper and lower arms of npn transistors of U-phase arm 22, V-phase arm 24 and W-phase arm 26 of inverter 20, respectively.

Inverter 30 includes a U-phase arm 32, a V-phase arm 34 and a W-phase arm 36. Motor generator MG2 includes a three-phase coil 14 as a stator coil. Inverter 30 and motor generator MG2 have the same structures as inverter 20 and motor generator MG1, respectively.

Power line NL1 has one end connected to neutral point N1 of three-phase coil 12 and the other end connected to connector 50. Power line NL2 has one end connected to neutral point N2 of three-phase coil 14 and the other end connected to connector 50. Capacitor C2 is connected between power lines NL1 and NL2.

Power storage device B is a rechargeable DC power source, such as a nickel hydride or lithium ion secondary battery. Power storage device B outputs a DC power to capacitor C1, and is charged by inverter 20 and/or 30. It is noted that a large capacity capacitor may be used as power storage device B.

Capacitor C1 smoothes voltage fluctuation between power line PL and ground line SL. Voltage sensor 72 detects voltage between terminals of capacitor C1, that is, voltage VDC of power line PL to ground line SL, and outputs the detected voltage VDC to ECU 60.

In accordance with a signal PWM1 from ECU 60, inverter 20 converts the DC voltage received from capacitor C1 to a three-phase AC voltage, and outputs the converted three-phase AC voltage to motor generator MG1. Further, inverter 20 converts three-phase AC voltage generated by motor generator MG1 receiving power from engine 4 to a DC voltage in accordance with the signal PWM1 from ECU 60, and outputs the converted DC voltage to power line PL.

In accordance with a signal PWM2 from ECU 60, inverter 30 converts the DC voltage received from capacitor C1 to a three-phase AC voltage, and outputs the converted three-phase AC voltage to motor generator MG2. Further, inverter 30 converts three-phase AC voltage generated by motor generator MG2 receiving rotational force of wheel 2 at the time of regenerative braking of the vehicle to a DC voltage in accordance with the signal PWM2 from ECU 60, and outputs the converted DC voltage to power line PL.

Here, when AC current is input from commercial power supply 90 connected to connector 50 by connector 92, inverters 20 and 30 convert the AC power applied from commercial power supply 90 through power lines NL1 and NL2 to neutral points N1 and N2 to DC power and output the power to power line PL by a method that will be described later, to charge power storage device B.

Capacitor C2 removes influence of ripple to commercial power supply 90 connected to connector 50. Voltage sensor 74 detects a voltage VAC across power lines NL1 and NL2, and outputs the detected voltage VAC to ECU 60. Current sensor 86 detects a current IAC flowing through power line NL2 and outputs the detected current IAC to ECU 60. It is noted that current flowing through power line NL1 may be detected by current sensor 86.

Each of motor generators MG1 and MG2 is a three-phase AC electric motor, implemented, for example, by three-phase AC synchronous motor generator. Motor generator MG1 is driven for regeneration by inverter 20, and outputs three-phase AC voltage generated using the power of engine 4 to inverter 20. Further, motor generator MG1 is driven for power running by inverter 20 at the start of engine 4, attaining cranking of engine 4. Motor generator MG2 is driven for power running by inverter 30, and generates power for driving wheel 2. Further, at the time of regenerative braking of the vehicle, motor generator MG2 is driven for regeneration by inverter 30, and outputs three-phase AC voltage generated by using rotational power received from wheel 2 to inverter 30.

Current sensor 82 detects motor current I1 flowing through coils of respective phases of motor generator MG1, and outputs the detected motor current I1 to ECU 60. Current sensor 84 detects motor current I2 flowing through coils of respective phases of motor generator MG2, and outputs the detected motor current I2 to ECU 60. Resolver 94 detects rotation angle θ1 of the rotor of motor generator MG1, and outputs the detected rotation angle θ1 to ECU 60. Resolver 96 detects rotation angle θ2 of motor generator MG2, and outputs the detected rotation angle θ2 to ECU 60.

ECU 60 generates signals PWM1 and PWM2 for driving inverters 20 and 30, respectively, and outputs the generated signals PWM1 and PWM2 to inverters 20 and 30, respectively.

When connector 92 of commercial power supply 90 is connected to connector 50 and charging of power storage device B from commercial power supply 90 is requested based on a signal AC, ECU 60 controls inverters 20 and 30 such that the AC power applied from commercial power supply 90 to neutral points N1 and N2 is converted to DC power for charging power storage device B. Details of charge control here will be described later.

The signal AC is a signal requesting charging of power storage device B from commercial power supply 90, and when a user operates, for example, an input device (not shown, same in the following) for instructing charging of power storage device B from commercial power supply 90, the signal changes according to the request.

Figure 2:
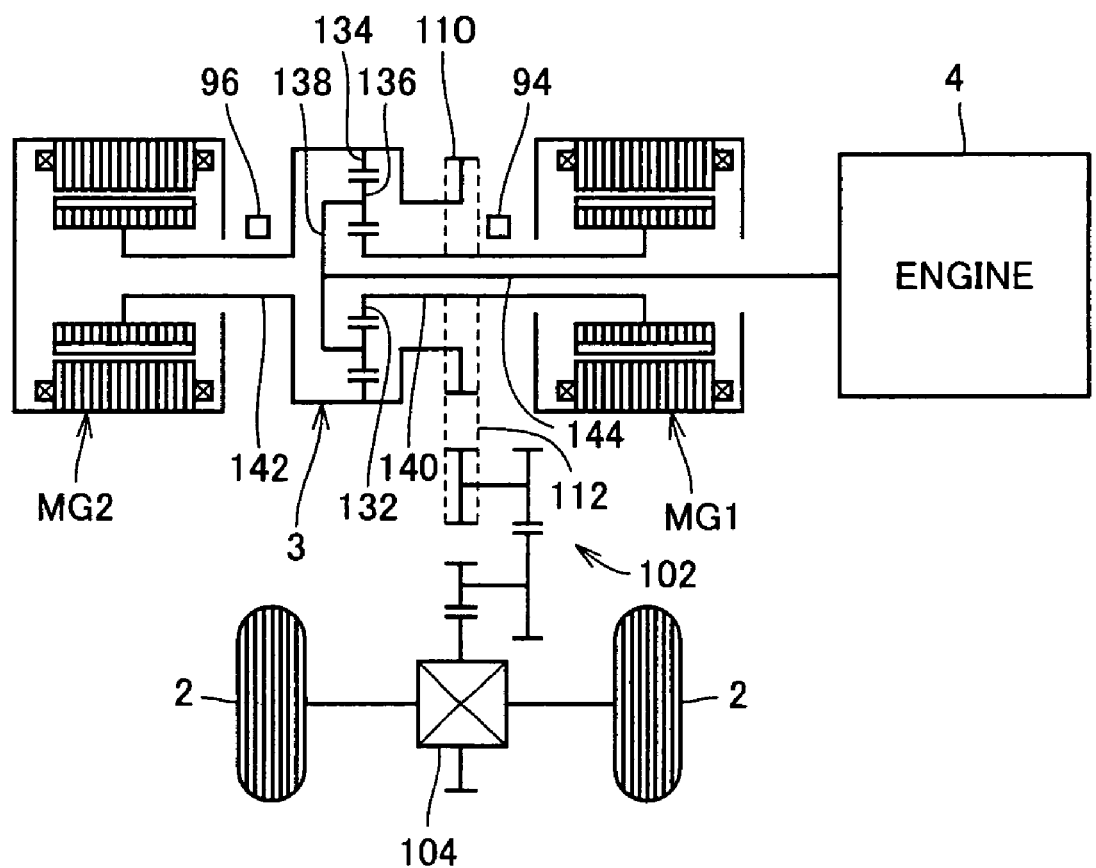
FIG. 2 shows a schematic configuration of a power transmitting mechanism of the hybrid vehicle shown in FIG. 1.

FIG. 2 shows a schematic configuration of a power transmitting mechanism of the hybrid vehicle 100 shown in FIG. 1. Referring to FIG. 2, hybrid vehicle 100 includes a power transmission gear 102, a differential gear 104, wheels 2, a power split device 3, a power extracting gear 110, a chain belt 112, motor generators MG1 and MG2, engine 4, and resolvers 94 and 96.

Motor generator MG1 has its rotor coupled to a sun gear shaft 140, and motor generator MG2 has its rotor coupled to a ring gear shaft 142. Engine 4 has a crankshaft coupled to a carrier shaft 144 provided to pass through an axial center of hollow sun gear shaft 140.

Power split device 3 consists of a planetary gear mechanism. Power split device 3 includes a sun gear 132, a ring gear 134, a plurality of planetary pinion gears 136, and a planetary carrier 138. Sun gear 132 is coupled to sun gear shaft 140. Ring gear 134 is coupled to ring gear shaft 142. The plurality of planetary pinion gears 136 are arranged between sun gear 132 and ring gear 134, rotating and revolving around an outer circumference of sun gear 132. Planetary carrier 138 is coupled to an end portion of carrier shaft 144 and axially supports the rotation axis of each planetary pinion gear 136.

In the power split device 3, three shafts, that is, sun gear shaft 140, ring gear shaft 142 and carrier shaft 144 coupled to sun gear 132, ring gear 134 and planetary carrier 138, respectively, serve as power input/output shafts, and when power input to/output from two of the three shafts is determined, the power to be input to/output from the remaining one shaft is determined based on the power input to/output from the other two shafts.

Power extracting gear 110 is coupled to ring gear 134. Power extracting gear 110 is connected to power transmission gear 102 through chain belt 112, and transmits power received from ring gear 134 to power transmission gear 102 through chain belt 112. Power transmission gear 102 transmits power to wheels 2 through differential gear 104.

It is noted that ring gear 134 is coupled to ring gear shaft 142, which ring gear shaft 142 is coupled to the rotor of motor generator MG2 and, therefore, it follows that motor generator MG2 is coupled to the driving shaft of the vehicle.

Figure 3:
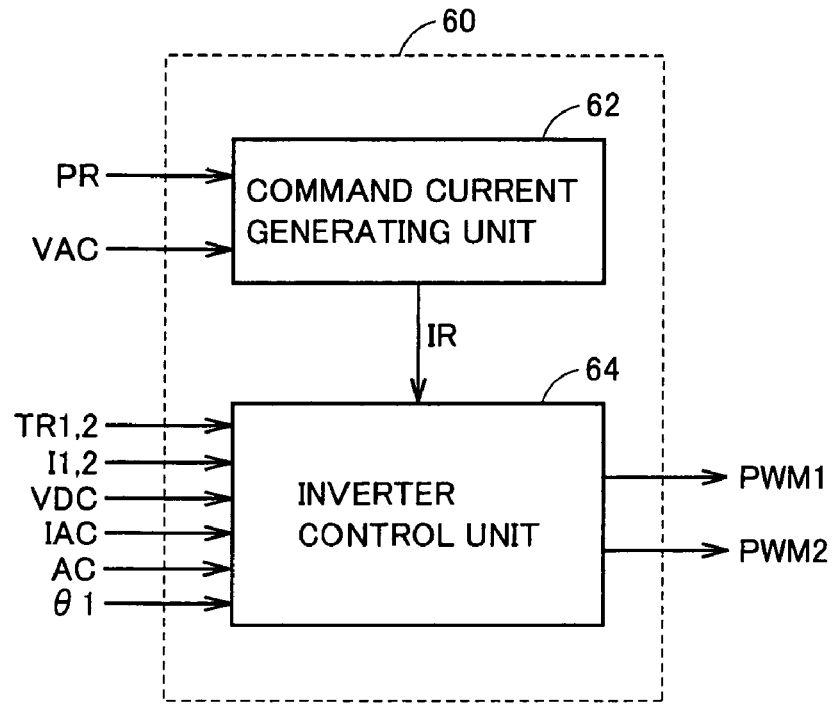
FIG. 3 is a functional block diagram of ECU shown in FIG. 1.

FIG. 3 is a functional block diagram of ECU 60 shown in FIG. 1. Referring to FIG. 3, ECU 60 includes a command current generating unit 62, and an inverter control unit 64. Command current generating unit 62 generates a command current IR for charging power storage device B with power factor of 1 with respect to commercial power supply 90, based on a charge/discharge power command value PR received from the vehicle ECU (not shown, same in the following) and based on the voltage VAC from voltage sensor 74.

Based on torque control values TR1 and TR2 of motor generators MG1 and MG2 received from vehicle ECU, motor currents I1 and I2 from current sensors 82 and 84, voltage VDC from voltage sensor 72, current IAC from current sensor 86, signal AC, rotation angle θ1 of motor generator MG1 from resolver 94 and command current IR from command current generating unit 62, inverter control unit 64 generates a signal PWM1 for turning on/off npn transistors Q11 to Q16 of inverter 20 and a signal PWM2 for turning on/off npn transistors Q21 to Q26 of inverter 30, and outputs the generated signals PWM1 and PWM2 to inverters 20 and 30, respectively.

Figure 4:
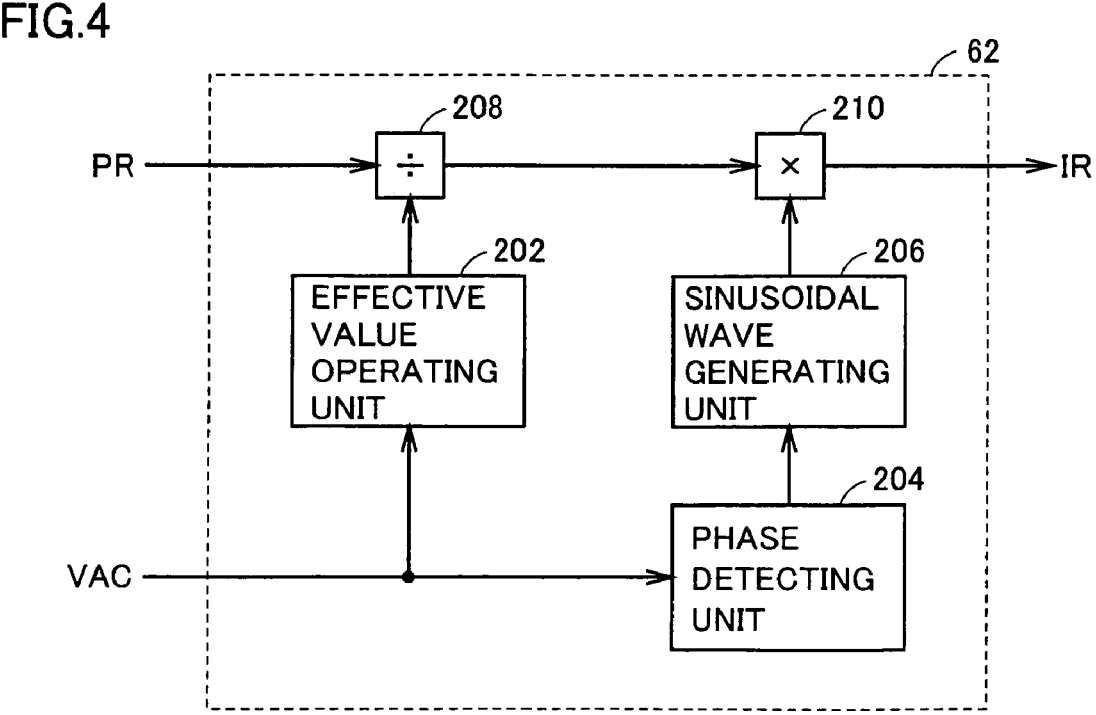
FIG. 4 is a detailed functional block diagram of a command current generating unit shown in FIG. 3.

FIG. 4 is a detailed functional block diagram of command current generating unit 62 shown in FIG. 3. Referring to FIG. 4, command current generating unit 62 includes an effective value operating unit 202, a phase detecting unit 204, a sinusoidal wave generating unit 206, a dividing unit 208 and a multiplying unit 210. Effective value operating unit 202 detects peak voltage of voltage VAC, and based on the detected peak voltage, calculates an effective value of voltage VAC. Phase detecting unit 204 detects a zero-cross point of voltage VAC, and based on the detected zero-cross point, detects the phase of voltage VAC.

Sinusoidal wave generating unit 206 generates a sinusoidal wave of the same phase as voltage VAC, based on the phase of voltage VAC detected by phase detecting unit 204. By way of example, sinusoidal wave generating unit 206 can generate a sinusoidal wave of the same phase as voltage VAC, based on the phase from phase detecting unit 204, using a table of sinusoidal function.

Dividing unit 208 divides the charge/discharge power command value PR by the effective value of voltage VAC from effective value operating unit 202, and outputs the result of operation to multiplying unit 210. Multiplying unit 210 multiplies the result of operation of dividing unit 208 by the sinusoidal wave from sinusoidal wave generating unit 206, and outputs the result of operation as command current IR.

The command current IR generated in this manner does not involve any harmonics component or fluctuation component of commercial power supply 90. Therefore, when inverters 20 and 30 are controlled based on the command current IR, ineffective electric power or harmonics current corresponding to the harmonics component and fluctuation component of commercial power supply 90 are not generated. Further, command current IR is in phase with commercial power supply 90, and the power factor is 1 with respect to the voltage of commercial power supply 90. This enables efficient charging of power storage device B from commercial power supply 90.

Figure 5:
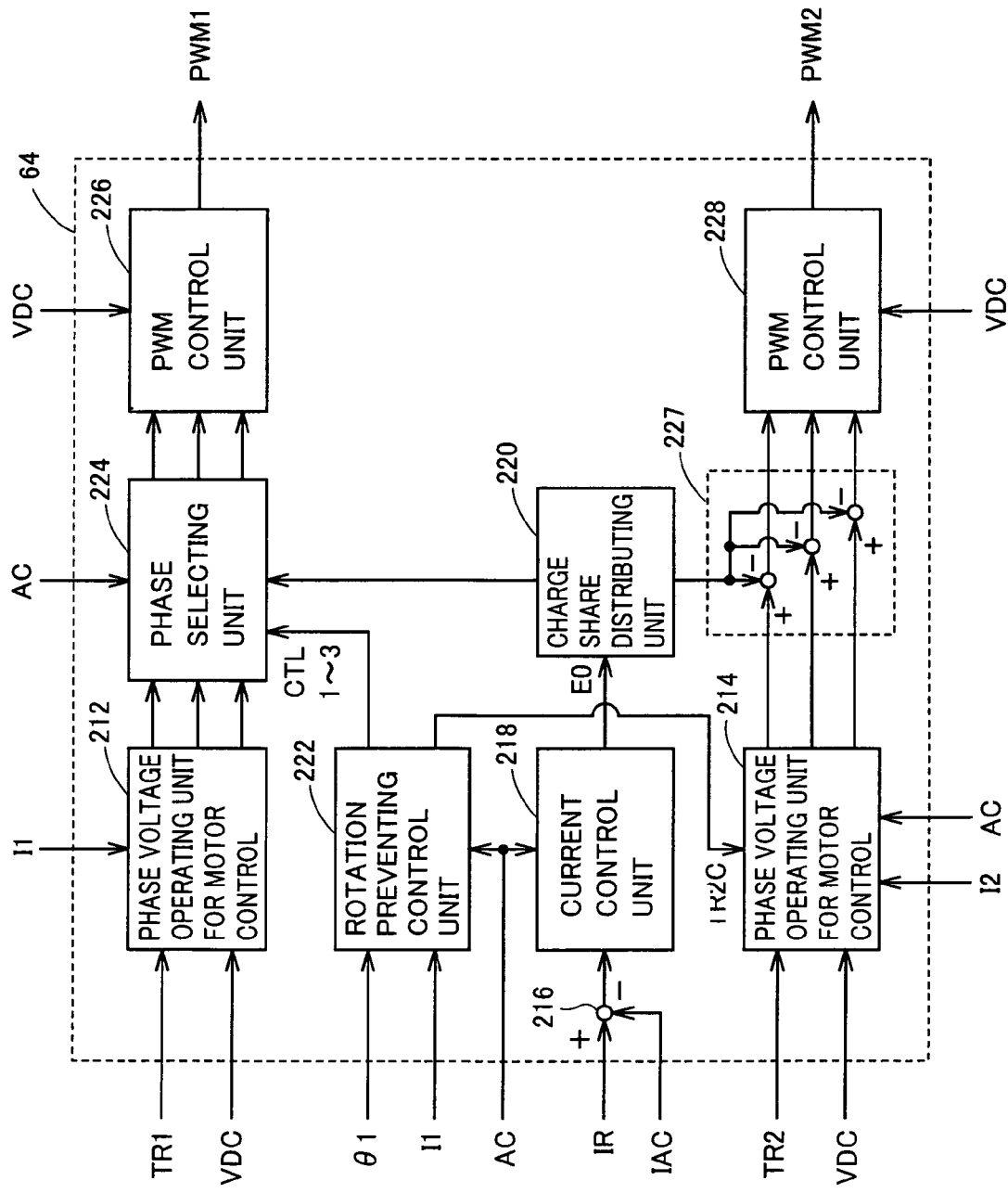
FIG. 5 is a detailed functional block diagram of an inverter control unit shown in FIG. 3.

FIG. 5 is a detailed functional block diagram of inverter control unit 64 shown in FIG. 3.

Referring to FIG. 5, inverter control unit 64 includes phase-voltage operating units 212 and 214 for motor control, subtracting units 216 and 227, a current control unit 218, a charge share distributing unit 220, a rotation preventing control unit 222, a phase selecting unit 224, and PWM control units 226 and 228.

Subtracting unit 216 subtracts current IAC from command current IR, and outputs the result to current control unit 218. When the signal AC is active, current control unit 218 generates a command voltage E0 for causing current IAC to follow command current IR based on deviation between command current IR and current IAC, and outputs the generated command voltage E0 to charge share distributing unit 220. In current control unit 218, by way of example, proportional-integral control (PI control) takes place. When the signal AC is inactive, current control unit 218 is inactivated, and command voltage E0 of 0 is output.

Charge share distributing unit 220 determines share of inverters 20 and 30 for generating voltage difference across neutral points N1 and N2 based on command voltage E0. Specifically, charge share distributing unit 220 multiplies the command voltage E0 by k (k is a constant not smaller than 0 and not larger than 1) and outputs the result to phase selecting unit 224, and multiplies the command voltage E0 by (1−k) and outputs the result to subtracting unit 227. If k exceeds 0.5, the share of inverter 20 increases, and if k is smaller than 0.5, share of inverter 30 increases.

When the signal AC is active, that is, when charging from commercial power supply 90 to power storage device B is controlled (hereinafter, the expression "charge control" will mean control of charging from commercial power supply 90 to power storage device B), rotation preventing control unit 222 determines one phase on which switching control is to be performed in inverter 20, based on the rotation angle θ1 of motor generator MG1.

As regards signals CTL1 to CTL3 output to phase selecting unit 224, rotation preventing control unit 222 activates the signal CTL1 when the phase is determined to be U-phase, activates the signal CTL2 when the phase is determined to be V-phase, and activates the signal CTL3 when the phase is determined to be W-phase.

When only one phase of inverter 20 is controlled, torque generates in motor generator MG1, and the torque is transmitted through power split device 3 to the driving shaft of the vehicle. Here, rotation preventing control unit 222 generates a torque control value TR2C of motor generator MG2 for canceling out the torque transmitted from motor generator MG1 to the driving shaft, and outputs the generated torque control value TR2C to phase voltage operating unit 214 for motor control.

Phase voltage operating unit 212 for motor control calculates the command voltage to be applied to coils of respective phases of motor generator MG1 based on torque control value TR1 and motor current I1 of motor generator MG1 and on the voltage VDC, and outputs the calculated command voltage of each phase to phase selecting unit 224.

When the signal AC is inactive, phase selecting unit 224 directly outputs the command voltage of each phase from phase voltage operating unit 212 for motor control to PWM control unit 226. Further, if the signals AC and CTL1 are active, phase selecting unit 224 outputs command voltages of respective phases to PWM control unit 226, with U-phase command voltage being the command voltage from charge share distributing unit 220, and V and W phase command voltages being 0.

Further, when the signals AC and CTL2 are active, phase selecting unit 224 outputs command voltages of respective phases to PWM control unit 226, with V-phase command voltage being the command voltage from charge share distributing unit 220, and U and W phase command voltages being 0. When the signals AC and CTL3 are active, phase selecting unit 224 outputs command voltages of respective phases to PWM control unit 226, with W-phase command voltage being the command voltage from charge share distributing unit 220, and U and V phase command voltages being 0.

Based on the command voltage of each phase from phase selecting unit 224, PWM control unit 226 generates the signal PWM1 for actually turning on/off each of the npn transistors Q11 to Q16 of inverter 20, and outputs the generated signal PWM1 to each of the npn transistors Q11 to Q16 of inverter 20.

When the signal AC is inactive, phase voltage operating unit 214 for motor control calculates a command voltage to be applied to the coils of respective phases of motor generator MG2 based on the torque control value TR2 and motor current I2 of motor generator MG2 and on voltage VDC, and outputs the calculated command voltage of each phase to subtracting unit 227.

When the signal AC is active, phase voltage operating unit 214 for motor control calculates a command voltage to be applied to the coils of respective phases of motor generator MG2 based on the torque control value TR2C from rotation preventing control unit 222, motor current I2 and the voltage VDC, and outputs the calculated command voltage of each phase to subtracting unit 227.

Subtracting unit 227 subtracts the command voltage output from charge share distributing unit 220 from the command voltage of each phase output from phase voltage operating unit 214 for motor control, and outputs the result to PWM control unit 228.

Based on the command voltage of each phase from subtracting unit 227, PWM control unit 228 generates the signal PWM2 for actually turning on/off each of the npn transistors Q21 to Q26 of inverter 30, and outputs the generated signal PWM2 to each of the npn transistors Q21 to Q26 of inverter 30.

In inverter control unit 64, command voltage E0 for causing current IAC to follow command current IR is distributed by charge share distributing unit 220. On the side of inverter 30, the command voltage from charge share distributing unit 220 is subtracted from the command voltage of each phase, and the resultant command voltage is applied to PWM control unit 228. Specifically, on the side of inverter 30, at the time of charge control, the zero-phase voltage is controlled by the command voltage from charge share distributing unit 220.

On the side of inverter 20, the command voltage from charge share distributing unit 220 is added to any one phase, by phase selecting unit 224 and applied to PWM control unit 226, and command voltages of other phases are set to zero. Specifically, on the side of inverter 20, at the time of charge control, only one phase is subjected to switching control, based on the command voltage from charge share distributing unit 220. The command voltage from charge share distributing unit 220 is added only to one phase and not to the command voltage of each phase, in order to utilize inductance of the coil of selected phase, in place of leakage inductance.

If a current is caused to flow only to one phase of motor generator MG1, torque generates in motor generator MG1, which torque is transmitted to the driving shaft of the vehicle through power split device 3. Therefore, rotation preventing control unit 222 calculates torque of motor generator MG1 based on the rotation angle θ1 and motor current I1 of motor generator MG1, calculates torque control value TR2C for canceling out the torque of motor generator MG1 by motor generator MG2 coupled to the driving shaft of the vehicle, and outputs the calculated value to phase voltage operating unit 214 for motor control.

Accordingly, even when only one phase is controlled in inverter 20 to ensure sufficient inductance at the time of charge control, rotation of the vehicle driving shaft can be prevented.

As described above, on the side of inverter 30, the zero-phase voltage is controlled based on the command voltage from charge share distributing unit 220 and, therefore, inverter control unit 64 can control the torque of motor generator MG2 without interfering the charge control.

Figure 6:
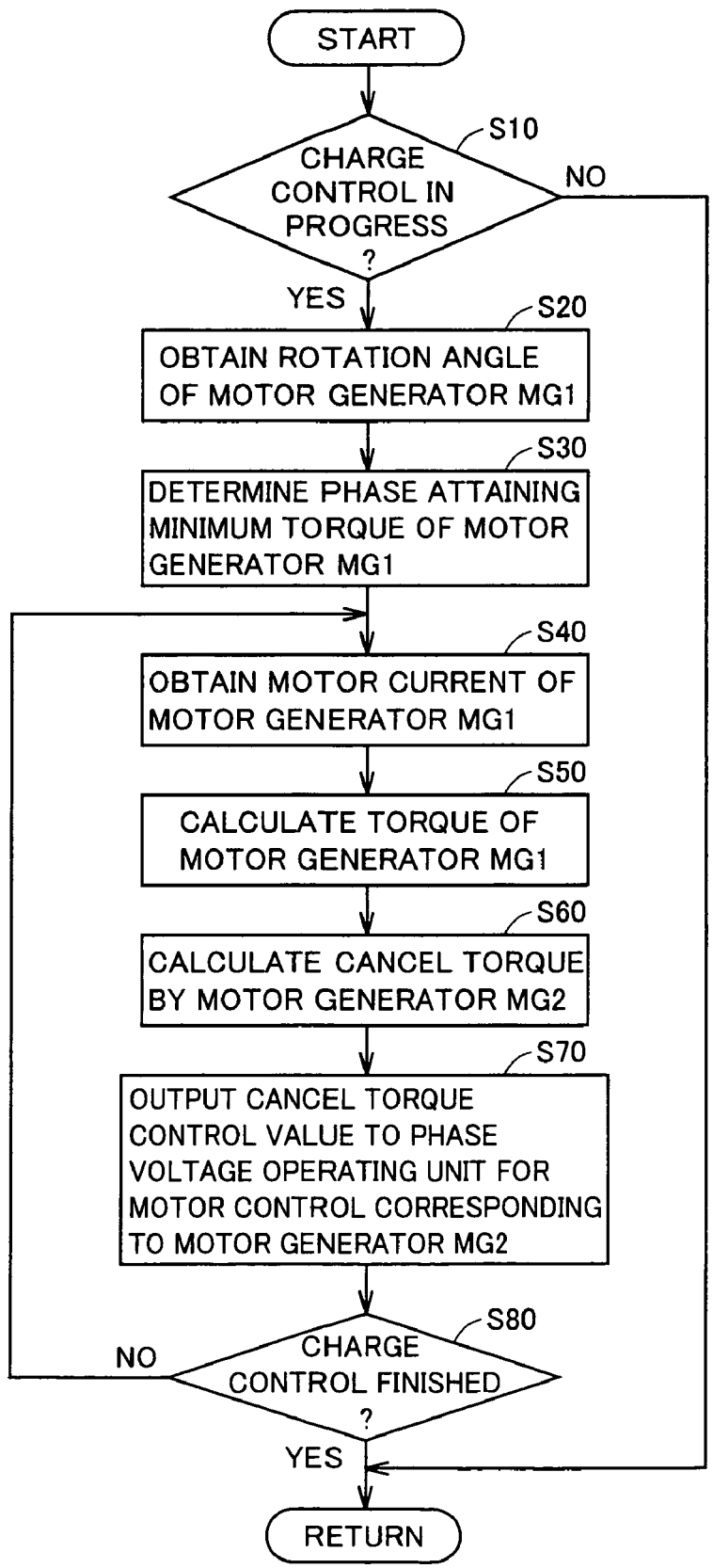
FIG. 6 is a flowchart representing the control structure of the rotation preventing control unit shown in FIG. 5.

FIG. 6 is a flowchart showing the control structure of rotation preventing control unit 222 shown in FIG. 5. The process of the flowchart is called from the main routine and executed at every prescribed time interval or every time prescribed conditions are satisfied.

Referring to FIG. 6, rotation preventing control unit 222 determines whether charge control of power storage device B from commercial power supply 90 is in progress, based on signal AC (step S10). If the signal AC is inactive and it is determined that charge control is not in progress (NO at step S10), rotation preventing control unit 222 ends the process without performing subsequent series of processes.

If the signal AC is active and it is determined that charge control is being done at step S10 (YES at step S10), rotation preventing control unit 222 obtains rotation angle θ1 of motor generator MG1 from resolver 94 (step S20). Based on the rotation angle θ1, rotation preventing control unit 222 determines a phase that provides minimum torque, among the three phases of motor generator MG1 (step S30). If the determined phase is the U-phase, rotation preventing control unit 222 activates the signal CTL1 to be output to phase selecting unit 224, and if the determined phase is V or W phase, activates the signal CTL2 or CTL3 to be output to phase selecting unit 224.

Thereafter, rotation preventing control unit 222 obtains the motor current I1 of motor generator MG1 from current sensor 82 (step S40). Then, rotation preventing control unit 222 calculates the torque TM1 of motor generator MG1, based on the motor current I1 and rotation angle θ1 (step S50).

Further, rotation preventing control unit 222 calculates torque control value TR2C for canceling out torque TM1 by motor generator MG2, based on the calculated torque TM1 of motor generator MG1 (step S60). Specifically, rotation preventing control unit 222 calculates the torque control value TR2C using the relation of TR2C=−TM1×ρ (ρ=number of teeth of ring gear 134/number of teeth of sun gear 132). Then, rotation preventing control unit 222 outputs the calculated torque control value TR2C to phase voltage operating unit 214 for motor control (step S70).

Thereafter, rotation preventing control unit 222 determines, based on the signal AC, whether the charge control is finished or not (step S80). If it is determined that charge control has been finished (YES at step S80), rotation preventing control unit 222 ends the series of processing. If it is determined that charge control has not yet been finished (NO at step S80), control is returned to step S40.

As described above, according to Embodiment 1, at the time of charge control, any one phase of inverter 20 is controlled and, therefore, inductance of the coil of motor generator MG1 corresponding to the controlled phase is utilized. Further, when the current is caused to flow through only one phase of motor generator MG1, torque generates in motor generator MG1 and the torque is transmitted to the vehicle driving shaft through power split device 3. According to Embodiment 1, motor generator MG2 is regulated to generate a torque that cancels out that torque and, hence, rotation of the driving shaft can be prevented.

Therefore, according to Embodiment 1, sufficient inductance can be attained when power storage device B is charged from commercial power supply 90, and movement of hybrid vehicle 100 can reliably be prevented.

Embodiment 2

In Embodiment 1, during charge control, only one phase of inverter 20 is controlled to attain large conductance, and motor generator MG2 is caused to generate a torque that cancels out the torque generated by motor generator MG1.

In Embodiment 2, during charge control, rotation resistance of engine 4 is lowered, so that the torque generated by motor generator MG1 is not transmitted through power split device 3 to the driving shaft. Therefore, rotation resistance of carrier shaft 144 coupled to engine 4 is reduced, and even if sun gear shaft 140 coupled to motor generator MG1 rotates, carrier shaft 144 rotates accordingly and, therefore, transmission of the torque to ring gear shaft 142 coupled to the vehicle driving shaft can be prevented.

Figure 7:
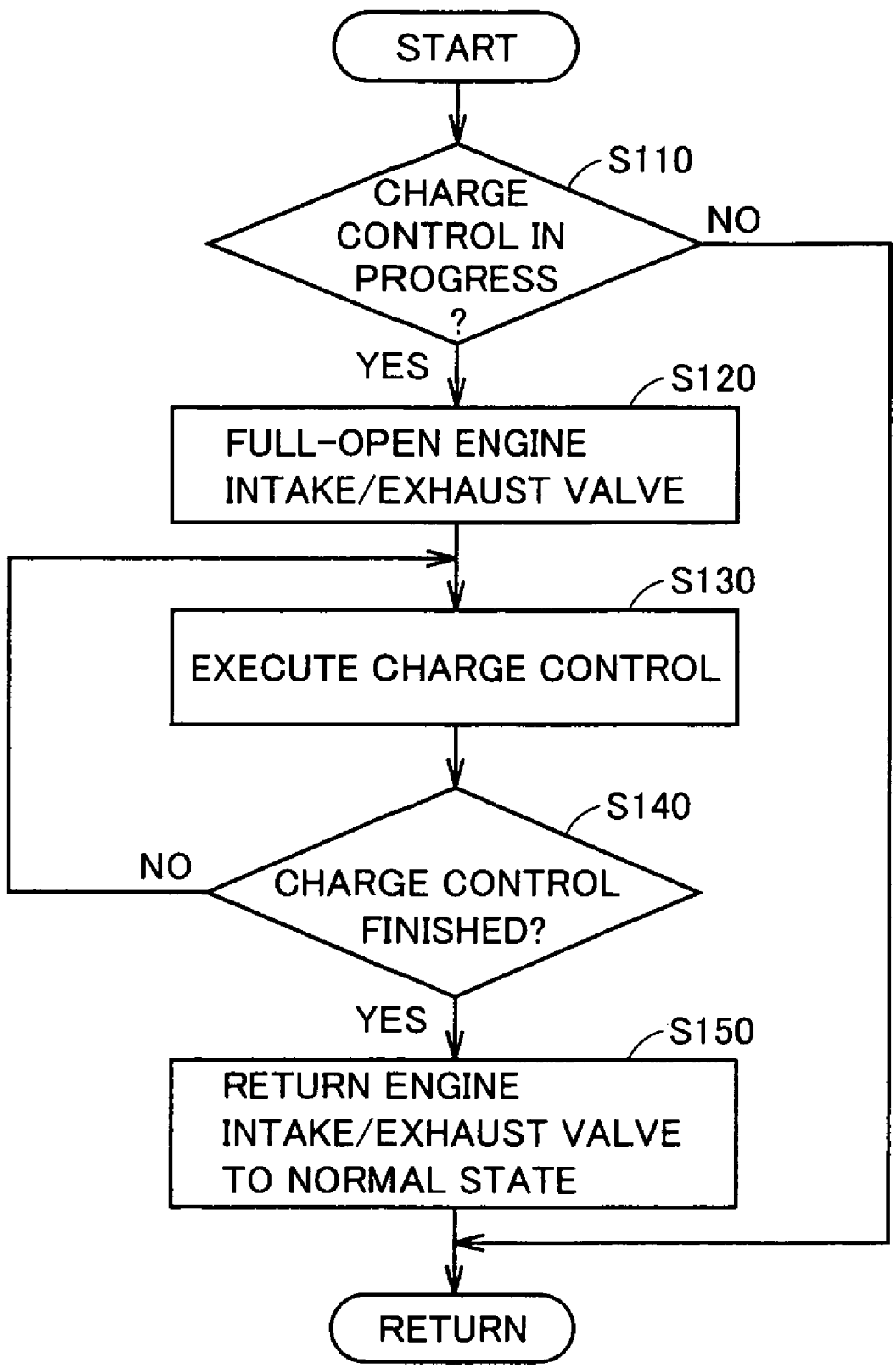
FIG. 7 is a flowchart representing charge control in accordance with Embodiment 2.

FIG. 7 is a flowchart representing the charge control in accordance with Embodiment 2. Referring to FIG. 7, ECU 60 determines whether charge control is in progress or not based on the signal AC (step S110). If it is determined that charge control is not in progress (NO at step S110), ECU 60 ends the process without performing subsequent processes.

If it is determined at step S110 that charge control is in progress (YES at step S110), ECU 60 sets an intake/exhaust valve of engine 4 to a full-open state (step S120). By implementing the intake/exhaust valve of engine 4 by an electromagnetically driven valve, the intake/exhaust valve can be fully opened even if the engine 4 is stopped.

When the intake/exhaust valve is fully open, ECU 60 executes charge control (step S130). Specifically, ECU 60 executes the charge control similar to that of Embodiment 1, except that torque control value TR2C of motor generator MG2 for canceling out the torque generated by motor generator MG1 is not generated.

Thereafter, ECU 60 determines whether charge control is finished or not, based on the signal AC (step S140). If charge control is determined to be finished (YES at step S140), ECU 60 returns the intake/exhaust valve of engine 4 from the full-open state to the normal state, and ends the process (step S150). If it is determined at step S140 that charge control is not yet finished (NO at step S140), ECU 60 returns the process back to step S130.

As described above, in Embodiment 2, the intake/exhaust valve of engine 4 is fully opened during charge control and, therefore, rotation resistance of engine 4 and carrier shaft 144 coupled thereto is reduced. Therefore, according to Embodiment 2, it is possible to prevent the torque generated by motor generator MG1 during charge control from being transmitted to the vehicle driving shaft through power split device 3.

Embodiment 3

In Embodiment 3, a clutch is provided between carrier shaft 144 and engine 4, and at the time of charge control, the clutch is set to a disengaged state, to reduce rotation resistance of carrier shaft 144.

Figure 8:
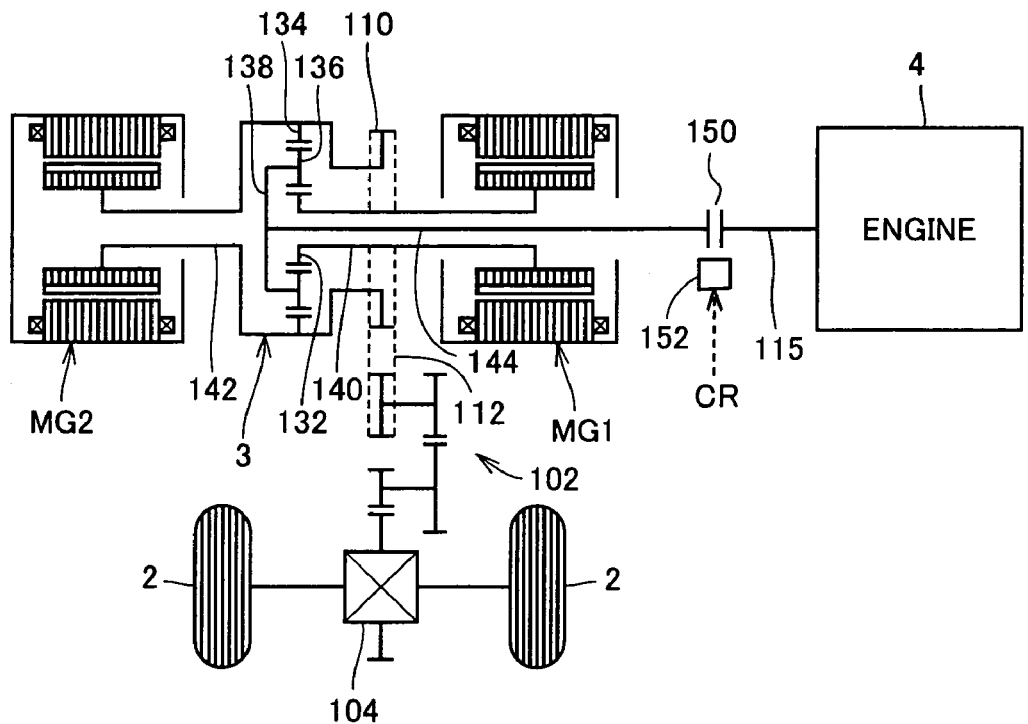
FIG. 8 shows a schematic configuration of a power output mechanism in the hybrid vehicle in accordance with Embodiment 3.

FIG. 8 shows a schematic configuration of a power output mechanism in the hybrid vehicle in accordance with Embodiment 3. Referring to FIG. 8, the power output mechanism in accordance with Embodiment 3 corresponds to the configuration shown in FIG. 2 and additionally includes a clutch 150 and a clutch actuator 152.

Clutch 150 is arranged between a crankshaft 115 of engine 4 and carrier shaft 144. Clutch actuator 152 engages and disengages clutch 150, based on a signal CR from ECU 60, not shown. Specifically, when the signal CR is active, clutch actuator 152 sets clutch 150 to the disengaged state, and when the signal CR is inactive, it sets clutch 150 to the engaged state.

In Embodiment 3, during charge control, the signal CR is activated and clutch 150 is set to the disengaged state. As a result, rotation resistance of carrier shaft 144 is reduced.

Therefore, according to Embodiment 3 also, it is possible to prevent the torque generated by motor generator MG1 during charge control from being transmitted to the vehicle driving shaft through power split device 3.

Embodiment 4

In Embodiment 4, a brake is provided to stop rotation of sun gear shaft 140 coupled to the rotor of motor generator MG1, and at the time of charge control, the brake is operated. Therefore, rotation of motor generator MG1 is directly prevented at the time of charge control.

Figure 9:
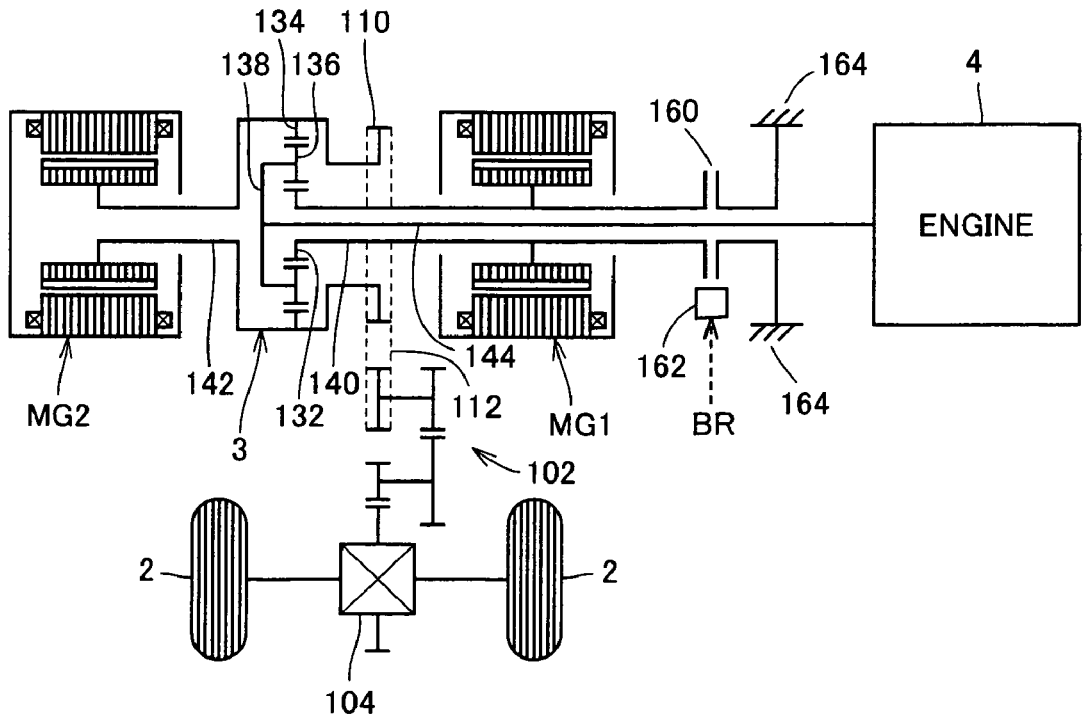
FIG. 9 shows a schematic configuration of a power output mechanism in the hybrid vehicle in accordance with Embodiment 4.

FIG. 9 shows a schematic configuration of a power output mechanism in the hybrid vehicle in accordance with Embodiment 4. Referring to FIG. 9, the power output mechanism in accordance with Embodiment 4 corresponds to the configuration shown in FIG. 2 and additionally includes a brake 160 and a brake actuator 162.

Brake 160 is arranged between sun gear shaft 140 and a transmission case 164. Brake actuator 162 engages and disengages brake 160 based on a signal BR from ECU 60, not shown. Specifically, when the signal BR is active, brake actuator 162 engages brake 160 and, when signal BR is inactive, disengages brake 160.

In Embodiment 4, during charge control, the signal BR is activated and brake 160 is set to the engaged state. As a result, sun gear shaft 140 is fixed on transmission case 164. Therefore, according to Embodiment 4, at the time of charge control, rotation of motor generator MG1 is prevented and, as a result, rotation of the vehicle driving shaft can be prevented.

Embodiment 5

In Embodiments 1 to 4 above, at the time of charge control, any one phase of inverter 20 is controlled. In that case, however, torque generates in motor generator MG1 and, therefore, means for preventing rotation of the driving shaft of the vehicle becomes necessary.

In Embodiment 5, at the time of charge control, inverter 20 is controlled such that current component in the q-axis direction attains to 0 in motor generator MG1. Consequently, larger inductance can be attained than when leakage inductance is used by causing equal currents to flow to coils of respective phases, while preventing rotation of motor generator MG1 without separately providing any means for preventing rotation.

Figure 10:
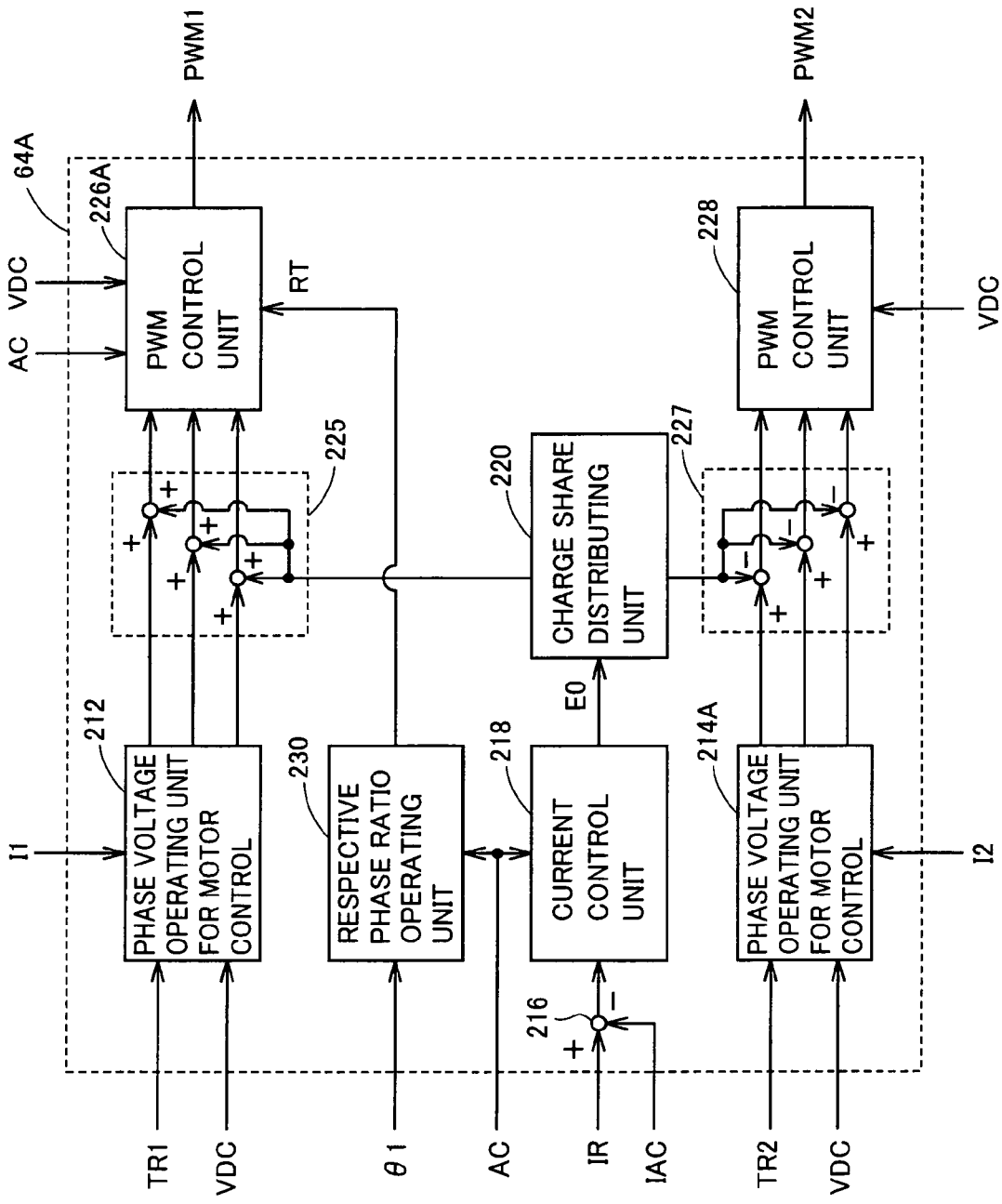
FIG. 10 is a functional block diagram of the inverter control unit in accordance with Embodiment 5.

FIG. 10 is a functional block diagram of the inverter control unit in accordance with Embodiment 5.

Referring to FIG. 10, inverter control unit 64A has the configuration of inverter control unit 64 in accordance with Embodiment 1 shown in FIG. 5 and includes, in place of rotation preventing control unit 222, phase selecting unit 224, PWM control unit 226 and phase voltage operating unit 214 for motor control, a respective phase ratio operating unit 230, an adding unit 225, a PWM control unit 226A and a phase voltage operating unit 214A for motor control, respectively.

Respective phase ratio operating unit 230 determines, when the signal AC is active, respective phase ratio RT with current component in the q-axis direction being 0, based on the rotation angle θ1 of motor generator MG1 from resolver 94. More specifically, respective phase ratio operating unit 230 can determine ratio of each of U, V and W phases, by applying θ1 to the rotation angle and applying 0 to the q-axis current, in a known conversion expression for converting the d, q coordinate system to the U, V, W coordinate system.

Then, respective phase ratio operating unit 230 outputs the determined respective phase ratio RT to PWM control unit 226A.

Adding unit 225 adds the command voltage from charge share distributing unit 220 to the command voltage of each phase from phase voltage operating unit 212 for motor control, and outputs the result to PWM control unit 226A.

When the signal AC is inactive, PWM control unit 226A generates the signal PWM1 for actually turning on/off each of the npn transistors Q11 to Q16 of inverter 20, based on the command voltage of each phase from adding unit 225, and outputs the generated signal PWM1 to each of the npn transistors Q11 to Q16 of inverter 20.

When the signal AC is active, PWM control unit 226A generates the signal PWM1 such that arms of respective phases of inverter 20 operates in time-divisional manner with the ratio RT of respective phases from respective phase ratio operating unit 230, based on the command voltage of each phase from adding unit 225, and outputs the generated signal PWM1 to each of the npn transistors Q11 to Q16 of inverter 20.

Figures 11, 12:
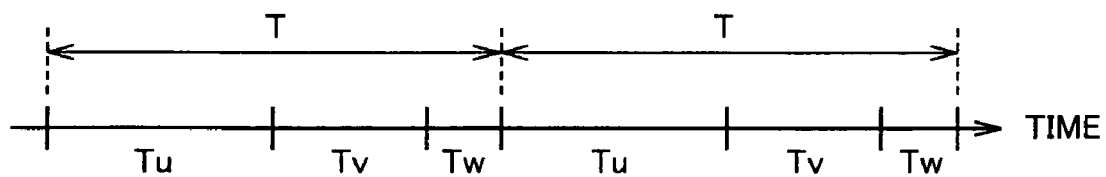
FIG. 11 illustrates operation timings of arms of respective phases of the inverter during charge control.
FIG. 12 represents operations of arms of respective phases of the inverter during charge control.

FIGS. 11 and 12 illustrate operation timings of arms of respective phases of the inverter 20 during charge control. Referring to FIGS. 11 and 12, time period Tu represents a period in which only the U-phase arm operates based on the U-phase command voltage, and V- and W-phase arms are shut-down (SDOWN). Time period Tv represents a period in which only the V-phase arm operates based on the V-phase command voltage, and U- and W-phase arms are shut-down (SDOWN). Time period Tw represents a period in which only the W-phase arm operates based on the W-phase command voltage, and U- and V-phase arms are shut-down (SDOWN).

Time periods Tu, Tv and Tw in period T are determined based on the ratio RT of respective phases calculated by respective phase ratio operating unit 230. Thus, the current component in the q-axis direction can equivalently be set to 0. The period T is set to be longer than the carrier period of inverter 20 and short enough not to cause rotation of rotor in motor generator MG1.

Again referring to FIG. 10, phase voltage operating unit 214A for motor control is the same as phase voltage operating unit 114 for motor control, except that torque control value TR2C and signal AC, which are received by phase voltage operating unit 114 for motor control shown in FIG. 5, are not received.

As described above, according to Embodiment 5, inverter control unit 64A performs charge control while preventing current component in the q-axis direction of motor generator MG1. Therefore, larger inductance can be attained than when leakage inductance is used by causing equal currents to flow to coils of respective phases, without generating any torque in motor generator MG1.

Therefore, according to Embodiment 5, sufficient inductance can be attained when power storage device B is charged from commercial power supply 90, and movement of the vehicle can be prevented without separately providing means for preventing rotation of the vehicle driving shaft.

Embodiment 6

In Embodiment 6, an example in which power storage device B is charged from commercial power supply 90 using one motor generator will be discussed.

Figure 13:
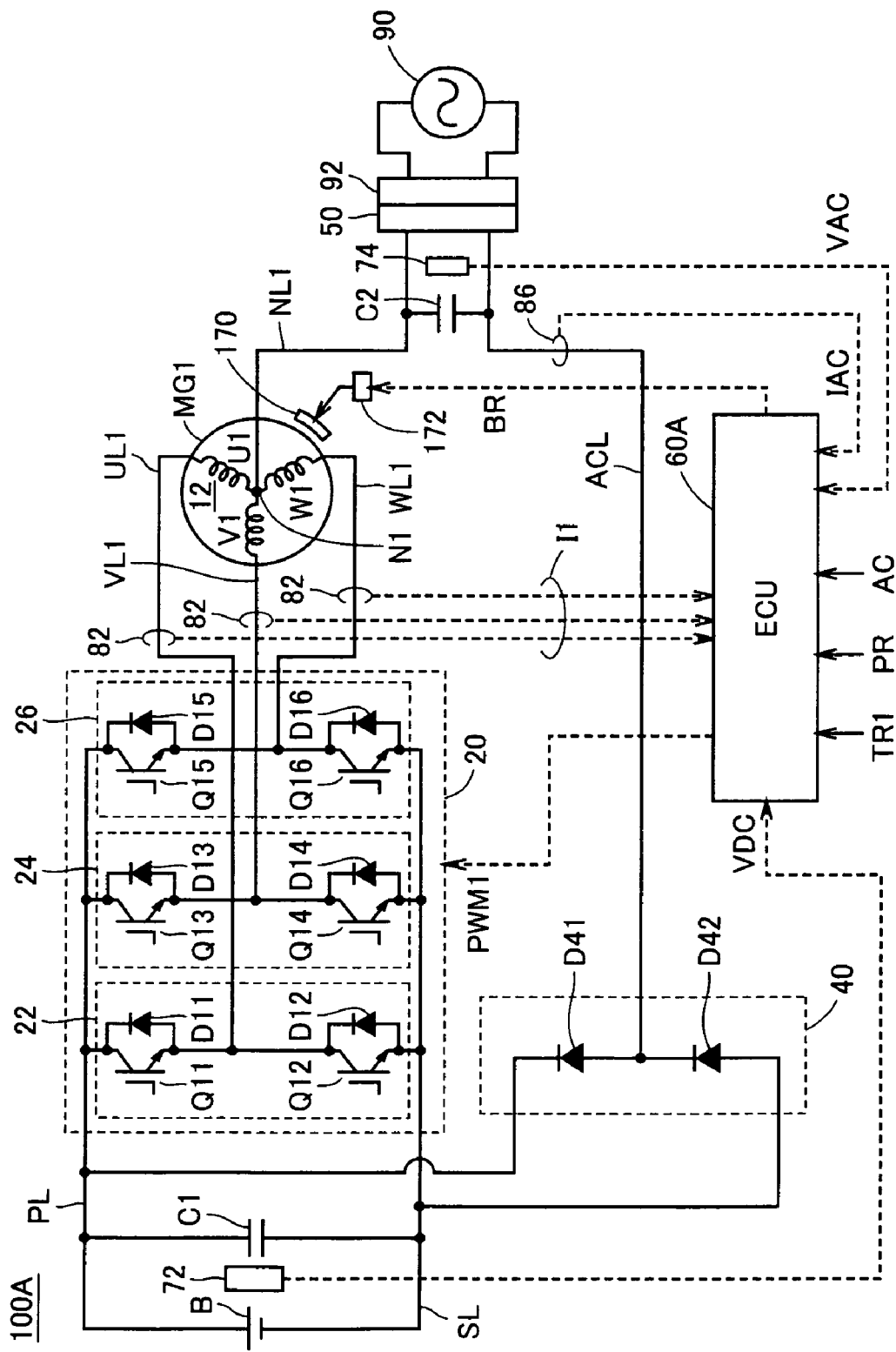
FIG. 13 is an overall block diagram of the vehicle in accordance with Embodiment 6.

FIG. 13 is an overall block diagram of the vehicle in accordance with Embodiment 6. Referring to FIG. 13, the vehicle 100A includes power storage device B, inverter 20, motor generator MG1, a rectifying circuit 40, an ECU 60A, power lines NL1 and ACL, connector 50, a brake 170 and a brake actuator 172.

Rectifying circuit 40 includes diodes D41 and D42. Diode D41 has its cathode connected to power line PL, and its anode connected to a cathode of diode D42, and diode D42 has its anode connected to ground line SL. To a node between diodes D41 and D42, one end of power line ACL is connected, and the other end of power line ACL is connected to connector 50.

Receiving an operation command from brake actuator 172, brake 170 fixes the rotor of motor generator MG1 not to rotate. Brake actuator 172 drives brake 170 in accordance with the signal BR from ECU 60A.

When the signal AC is active, that is, when charging of power storage device B from commercial power supply 90 is requested, ECU 60A selects any one phase of inverter 20 and controls switching. The method of selecting the phase and control of the selected phase are the same as in the control of inverter 20 at the time of charge control in accordance with Embodiment 1.

Further, when the signal AC is active, ECU 60A activates the signal BR output to brake actuator 172. In response, brake 170 operates, preventing rotation of motor generator MG1 during charge control.

In the foregoing ECU 60A is described to select any one phase of inverter 20 and to control switching during charge control. As in Embodiment 5, however, inverter 20 may be controlled such that current component in the q-axis direction equivalently attains to 0.

As described above, in Embodiment 6 also, sufficient inductance can be attained when power storage device B is charged from commercial power supply 90, and movement of the vehicle can reliably be prevented.

Further, in each of the embodiments described above, motor generators MG1 and MG2 are three-phase AC rotating electric machines. The present invention, however, can also be readily expanded and applied to poly-phase AC rotating electric machines other than three-phase ones.

In each of the embodiments above, a boost converter for converting DC voltage of power storage device B may be provided between power storage device B and inverters 20 and 30.

In the foregoing, connector 50 and power lines NL1 and NL2, or connector 50 and power lines NL1 and ACL form the "connecting device" of the present invention. Rotation preventing control unit 222, clutch 150 and clutch actuator 152, brake 160 and brake actuator 162, and brake 170 and brake actuator 172 each form the "rotation preventing unit" of the present invention.

Further, motor generators MG1 and MG2 correspond to the "first AC rotating electric machine" and the "second AC rotating electric machine," and inverters 20 and 30 correspond to the "first inverter" and the "second inverter" of the present invention. Further, engine 4 corresponds to the "internal combustion engine" of the present invention, and power split device 3 corresponds to the "gear mechanism" of the present invention.

Further, resolver 94 corresponds to the "rotation angle detecting device" of the present invention, and current sensor 82 corresponds to the "current detecting device" of the present invention. Further, clutch 150 corresponds to the "engaging element" of the present invention, and each of brakes 160 and 170 corresponds to the "braking device" of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A charge control device for charging a power storage device mounted on a vehicle from a power supply outside the vehicle, the charge control device comprising:
    an AC rotating electric machine including a star-connected first poly-phase winding as a stator winding;
    an inverter connected to said star-connected first poly-phase winding and performing power conversion between said AC rotating electric machine and said power storage device;
    a connecting device configured to allow connection of said power supply to a neutral point of said star-connected first poly-phase winding;
    an inverter control unit controlling any one phase of said inverter such that electric power from said power supply applied to said neutral point by said connecting device is converted to charge said power storage device; and
    a rotation preventing unit configured to prevent rotation of said AC rotating electric machine at a time of charging said power storage device from said power supply, wherein said rotation preventing unit includes a braking device fixing a rotor of said AC rotating electric machine to be in a non-rotating state.

2. A charge control device for charging a power storage device mounted on a vehicle from a power supply outside the vehicle, the charge control device comprising:
    a first AC rotating electric machine including a star-connected first poly-phase winding as a stator winding;
    a first inverter connected to said star-connected first poly-phase winding and performing power conversion between said first AC rotating electric machine and said power storage device;
    a connecting device configured to allow connection of said power supply to a first neutral point of said star-connected first poly-phase winding;
    an inverter control unit controlling any one phase of said first inverter such that electric power from said power supply applied to said first neutral point by said connecting device is converted to charge said power storage device;
    an internal combustion engine;
    a gear mechanism connected to an output shaft of said internal combustion engine, a rotation shaft of said first AC rotating electric machine and a driving shaft of the vehicle, the gear mechanism transmitting power among said output shaft, said rotation shaft and said driving shaft; and
    a rotation preventing unit configured to prevent rotation of said driving shaft by torque generated by said first AC rotating electric machine, when said power storage device is charged from said power supply.

3. The charge control device according to claim 2, further comprising:
    a second AC rotating electric machine having a rotation shaft mechanically coupled to said driving shaft of the vehicle;
    a second inverter driving said second AC rotating electric machine;
    a rotation angle detecting device detecting a rotation angle of said first AC rotating electric machine; and
    a current detecting device detecting a current flowing through said first AC rotating electric machine; wherein said rotation preventing unit calculates an output torque of said first AC rotating electric machine based on values detected by each of said rotation angle detecting device and said current detecting device, and controls said second inverter such that said second AC rotating electric machine outputs a torque canceling out the calculated output torque.

4. The charge control device according to claim 3, wherein
said second AC rotating electric machine includes a star-connected second poly-phase winding as a stator winding;
said connecting device is configured to allow connection of said power supply to said first neutral point and to a second neutral point of said star-connected second poly-phase winding; and
said inverter control unit further controls zero-phase voltage of said second inverter such that electric power from said power supply applied to said first and second neutral points by said connecting device is converted to charge said power storage device.

5. The charge control device according to claim 2, wherein said rotation preventing unit reduces rotation resistance of the output shaft of said internal combustion engine.

6. The charge control device according to claim 5, wherein said rotation preventing unit sets at least one of an intake valve and an exhaust valve of said internal combustion engine to an open state.

7. The charge control device according to claim 5, further comprising:
an engaging element provided between the output shaft of said internal combustion engine and said gear mechanism; wherein
said rotation preventing unit sets said engaging element to a disengaged state.

8. A charge control device for charging a power storage device mounted on a vehicle from a power supply outside the vehicle, the charge control device comprising:
a first AC rotating electric machine including a star-connected first poly-phase winding as a stator winding;
a first inverter connected to said star-connected first poly-phase winding and performing power conversion between said first AC rotating electric machine and said power storage device;
a connecting device configured to allow connection of said power supply to a first neutral point of said star-connected first poly-phase winding;
a rotation angle detecting device detecting a rotation angle of said first AC rotating electric machine; and
an inverter control unit controlling said first inverter such that electric power from said power supply applied to said first neutral point by said connecting device is converted to charge said power storage device, while current component in q-axis direction of said first AC rotating electric machine is prevented.

9. The charge control device according to claim 8, further comprising:
a second AC rotating electric machine including a star-connected second poly-phase winding as a stator winding; and
a second inverter connected to said star-connected second poly-phase winding and performing power conversion between said second AC rotating electric machine and said power storage device; wherein
said connecting device is configured to allow connection of said power supply to said first neutral point and to a second neutral point of said star-connected second poly-phase winding; and
said inverter control unit further controls zero-phase voltage of said second inverter such that electric power from said power supply applied to said first and second neutral points by said connecting device is converted to charge said power storage device.

10. A vehicle provided with a charge control device according to claim 1.

\* \* \* \* \*